(12) United States Patent
Florescu et al.

(10) Patent No.: US 7,805,715 B2
(45) Date of Patent: Sep. 28, 2010

(54) MODEL PUBLISHING FRAMEWORK

(75) Inventors: Octavian R. Florescu, Kirkland, WA (US); Ian Leslie, Ottawa (CA); Cheng-Yee Lin, Tualatin, OR (US)

(73) Assignee: International Business Machines Corporation, Armonk, NY (US)

( * ) Notice: Subject to any disclaimer, the term of this patent is extended or adjusted under 35 U.S.C. 154(b) by 1353 days.

(21) Appl. No.: 11/280,538

(22) Filed: Nov. 14, 2005

(65) Prior Publication Data

US 2007/0112793 A1 May 17, 2007

(51) Int. Cl.
*G06F 9/44* (2006.01)
*G06F 9/45* (2006.01)

(52) U.S. Cl. .......................... 717/145; 717/108; 717/116
(58) Field of Classification Search .................. None
See application file for complete search history.

(56) References Cited

U.S. PATENT DOCUMENTS

2004/0133414 A1* 7/2004 Adamson et al. .............. 703/22

OTHER PUBLICATIONS

J. Kaiser et al., "Implementing the Real-Time Publisher/Subscriber Model on the Controller Area Network (CAN)", AN-6314578, 1999, pp. 1-10.
IBM Corp., "Java Modeling: a UML workbook, Part 1", pp. 1-8, [retrieved online Jun. 7, 2001] http://www-106.ibm.com/developerworks/library/j-jmod0508/index.html.
IBM Corp., "Method for Delivering For-Fee Content to a Wireless Handheld Web Browser Device While Guaranteeing Ownership of Proprietary Content", Research Disclosure # 447171, Jul. 2001.
Y. Chun et al., "Universal-Based Database Information Publishing Model", Editorial Committee of Journal of Tsinghua University (Science and Technology), AN-7214983, 2002, pp. 1-6.
P.T. Eugster et al., "The Many Faces of Publish/Subscribe", ACM Computing Surveys, vol. 35, No. 2, Jun. 2003, pp. 114-131.
J. Greenfield et al., "Software Factories—Assembling Applications with Patterns, Models, Frameworks and Tools", ACM 1-58113-751-6/03/0010, pp. 16-27.
Popkin Software, "The UML Modeling Tour", pp. 1-3, [retrieved online May 31, 2005] http://www.pokin.com/products/system_architect/uml_modeling/uml....
R. Miller, "Practical UML: A Hands-On Introduction for Developers", Borland Developer Network, pp. 1-5, [retrieved online May 31, 2005] http://bdn.borland.com/article/0,1410,31863,00.html.

* cited by examiner

*Primary Examiner*—Chuck O Kendall
(74) *Attorney, Agent, or Firm*—Steven Lieske Bennett

(57) ABSTRACT

Provided are a method, system, and program for a model publishing framework. An intermediate data structure is generated from a model to include elements providing information on the model, wherein the model defines an object oriented program design. A publisher registry has a plurality of registered publishers. One registered publisher is selected from the publisher registry to use to publish the model. The publisher includes formatting information to generate model output. The selected publisher accesses the intermediate data structure and generates output from the elements in the intermediate data structure according to the formatting information to provide a visualization of the defined model.

20 Claims, 3 Drawing Sheets

Publisher Entry

Publisher Formatting Information

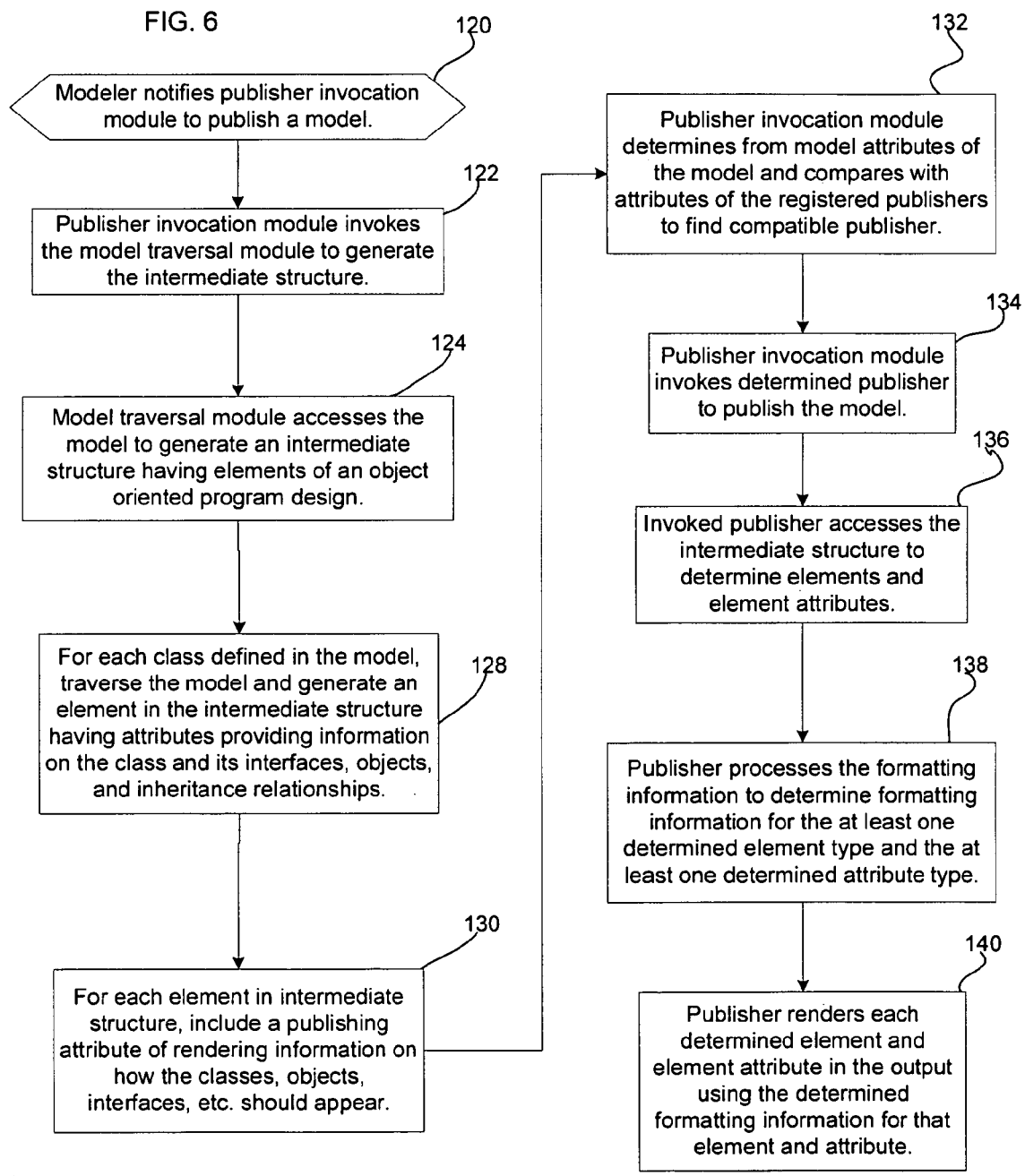

MODEL PUBLISHING FRAMEWORK

BACKGROUND OF THE INVENTION

1. Field of the Invention

The present invention relates to a method, system, and program for a model publishing framework.

2. Description of the Related Art

In developing a software program for a computing environment, the developer may create a model of an object oriented programming environment using a software development tool known as a modeler. The modeler is used to specify, visualize, construct and document a model of an object-oriented programming system under development. The modeler may code the model in a development language, such as the Unified Modeling Language (UML). A model may be defined at different levels of abstraction. For instance, a design model may provide representations of classes, class interfaces and class relationships, such as inheritance and subclass relationships. An implementation model may provide the specific methods and objects for each class, and may be generated as a Javadoc-style document. A scenario model may model all scenarios in the system or business with use case diagrams that describe the system in terms of actors, which are external agents that request a service from the system and use cases. Each use case may describe the scenario as a sequence of steps that are performed within the scenario, or the conditions of the scenario. Other types of models the modeler may create include, but are not limited to, object diagrams, sequence diagrams, collaboration diagrams, statechart diagrams, activity diagrams, component diagrams, and deployment diagrams.

The user may want to render the model as output to transfer to another person that may not have the modeler program that was used to create the model. In such case, the user may generate the model in a commonly available format, such as HyperText Markup Language ("HTML") or the Portable Document Framework (PDF), to share.

One issue with the user generating the model into a commonly available format is that the user may create the output in a specific style predefined by the modeler. However, the modeler may only provide a limited number of formatting and customization options for the output, which may not produce the output in the desired format.

SUMMARY

Provided are a method, system, and program for a model publishing framework. An intermediate data structure is generated from a model to include elements providing information on the model, wherein the model defines an object oriented program design. A publisher registry has a plurality of registered publishers. One registered publisher is selected from the publisher registry to use to publish the model. The publisher includes formatting information to generate model output. The selected publisher accesses the intermediate data structure and generates output from the elements in the intermediate data structure according to the formatting information to provide a visualization of the defined model.

BRIEF DESCRIPTION OF THE DRAWINGS

FIG. 5 illustrates an embodiment of operations to register a publisher.

FIG. 6 illustrates an embodiment of operations to select a publisher to publish a model.

DETAILED DESCRIPTION

Figure 1:
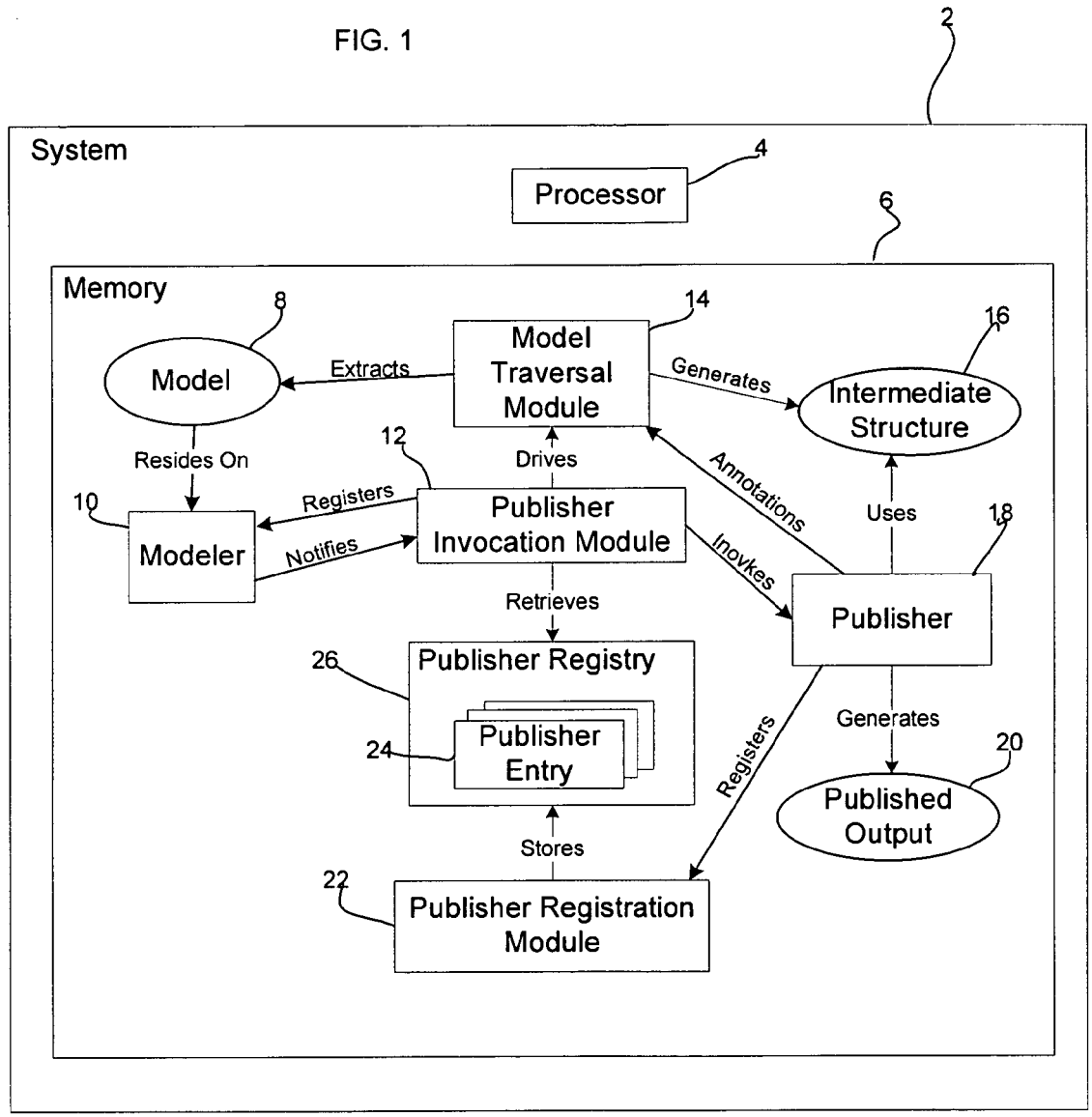
FIG. 1 illustrates an embodiment of a computing environment of a modeler and related components used to publish a model.

FIG. 1 illustrates a computing system 2 including a processor 4 and memory 6 in which programs execute. The memory 6 includes program components related to publishing a model 8. A modeler 10 is used to create a model 8 providing a definition of an object oriented programming model, where the model 8 may comprise a design, an implementation or scenarios (use case) which list activities related to different uses of the model. The model may provide additional representations of an object oriented design, such as object diagrams, sequence diagrams, collaboration diagrams, statechart diagrams, activity diagrams, component diagrams, and deployment diagrams.

The modeler 10 may comprise a modeling tool, such as a Unified Modeling Language (UML) tool, to generate models conforming to the UML language, where the model 8 includes artifacts of a model definition. For instance, for a class or design model, the defined artifacts may comprise definitions of classes, methods and interfaces of the class, objects of the class, and class relationships, such as inheritance and subclass relationships. The model 8 may also include artifacts of a use case diagram, object diagram, sequence diagram, collaboration diagram, statechart diagram, activity diagram, component diagram, and deployment diagrams. The modeler 10 allows the user to specify, visualize, construct and document an object oriented programming design under development. The modeler 10 allows the users to perform modeling activities (e.g. creating new classes and use cases, adding the relationships) for architecting a software application or systems, where publishing comprises one type of modeler 10 activity. A publisher invocation module 12 registers with the modeler 10. When the user of the modeler 10 is ready to publish a model 8, the user would select a registered publisher invocation module 12, which in turn would drive a model traversal module 14 to extract definitions of components defined in the model 8, where the defined components may comprise a class, interface, objects, relationships, use cases, sequences, collaborations, statecharts, activities, components, deployments, etc., from the model 8. There may be one or more publisher invocation modules 12 in the system 2. The model traversal module 14 may further generate an intermediate structure 16 providing a representation of the extracted components in the model 8. A modeler 10 supports models 8 in a particular modeling language, such as UML. Other modeling languages that the modeler 10 may support includes an Eclipse Modeling Framework (EMF) model, an Information Engineering (IE) model for database design, a model in Booch notation, etc.

A publisher 18 provides formatting information to use to render the elements in the intermediate structure 16, which provides information on the model 8, in published output 20. The formatting information may indicate where in the output to generate artifacts of the model, e.g., classes, interfaces, relationships, activities, use cases, methods, sequences, etc. Publishers 18 register with a publisher registration module 22. In this way, multiple publishers 18 may be supported. The publisher registration module 22 in turn registers a publisher entry 24 for the publisher 18 with a publisher registry 26 providing information on publishers 18 available to generate modules. The publisher invocation module 12 would select one publisher from the publisher entries 24 in the publisher registry 26 representing a registered publisher 18 to publish the model 8. The publisher invocation module 12 then invokes the selected publisher 18 to publish the information on the model 8 in the intermediate structure 16 according to the formatting information in the selected publisher 18.

In FIG. 1, the components 8, 10, 12, 14, 16, 18, 20, 22, and 26 are shown implemented in the memory 6 in a single system 2 and may communicate using shared memory resources. In an alternative embodiment, the components 8, 10, 12, 14, 16, 18, 20, 22, and 26 may be implemented in a distributing computing environment and communicate using a distributed computing communication protocol, such as remote invocation, etc. In one embodiment, the components are implemented in software. In an alternative embodiment, certain components, such as 12, 22, and 26, may be implemented in hardware.

Figure 2:
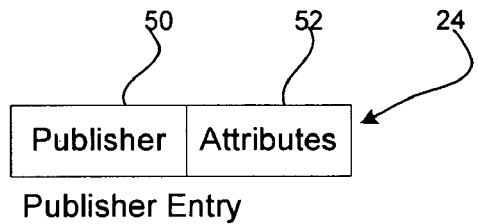
FIG. 2 illustrates an embodiment of a publisher entry in a publisher registry.

FIG. 2 illustrates an embodiment of a publisher entry 24 maintained in the publisher registry 26 for a registered publisher 18. The publisher entry 24 includes an identifier 50 of the publisher, such as a unique identifier or network or memory location at which the publisher 18 may be addressed, and attributes 52 of the publisher 18, such as whether the publisher is intended for a particular type of model 8, e.g., a design model, implementation model, scenario model, sequence model, etc.

Figure 3:
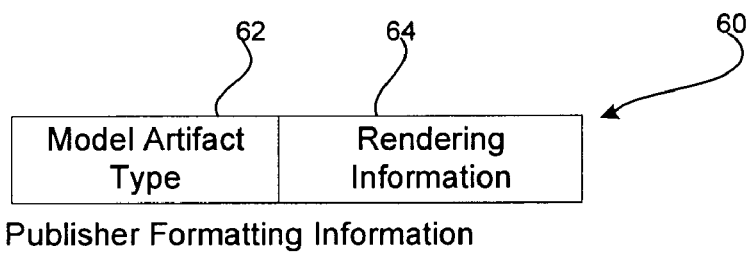
FIG. 3 illustrates an embodiment of publisher formatting information.

FIG. 3 illustrates an embodiment of an instance of formatting information 60 maintained by the publisher 18. The formatting information 60 includes a model artifact type 62, such as a class, interface, relationship, object, statechart, sequence, scenario, activity, use case, etc., and the rendering information 64 for that artifact type indicating the formatting and appearance of the model artifact type in the published output 20. The published output 20 may comprise a structured document, such as a Hypertext Markup Language (HTML) document, Extensible Markup Language (XML) document, Adobe Portable Document File (PDF) format, etc. The user may create different publishers 18 having different customized formatting features.

Figure 4:
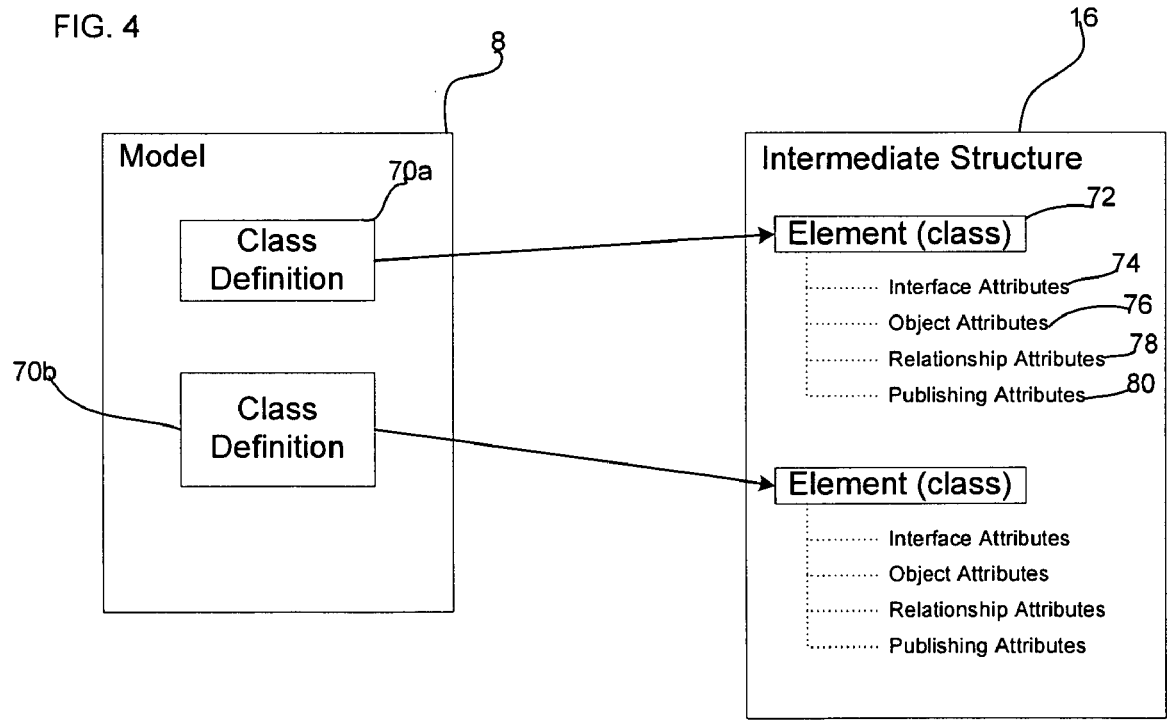
FIG. 4 illustrates an embodiment of how definitions in a model map to components in an intermediate structure.

FIG. 4 illustrates an example of how model 8 artifacts (definitions) may map to information in the intermediate structure 16. The model 8 includes class definitions 70a and 70b, which may be at a design level, class level, etc. The model 8 may further include use cases and the associated actors in use case diagrams, roles and associated messages in sequence diagrams, states and their transitions in state diagrams, etc. Further, the classes may have variable and operation attributes. The class definitions 70a and 70b may provide information on interfaces, methods, objects, relationships (inheritance and subclass) in an object oriented modeling language, such as UML, EMF, IE, Booch notation, etc. The definitions within a class definition, e.g., 70a, map to defined portions of the intermediate structure 16. For instance, a class definition may map to an element 72, class interfaces map to interface attributes 74 of the class element 72, class objects map to object attributes 76 of the class element 72, and class relationships to relationship attributes 78 (for subclass and inheritance) of the class element 72. Further, for implementation models, there may be attributes for the methods of the class. A scenario model may include different types of definitions, such as activities, uses, etc. that map to attributes for such definitions. A sequence definition may map to a sequence element or attribute, etc. The attributes may further include publishing attributes 80 providing information on how an element and/or attribute type may be rendered, e.g., font size, font, color, offset, etc. The intermediate structure 16 may comprise a structured document, such as an XML document.

FIG. 5 illustrates an embodiment of operations to register publishers 18 in the publisher registry 26. At block 100, a publisher 18 registers with the publisher registration module 22. The publisher registration module 22 adds (at block 102) a publisher entry 24 to the publisher registry 26 including information on the publisher, such as the identifier or location of the publisher 50 and attributes 54 of the publisher 18 (FIG. 2), such as what type of model the publisher 18 is used to publish.

FIG. 6 illustrates an embodiment of operations performed by the components 8, 10, 12, 14, 16, 18, 20, 22, and 26 to publish a model 8. Control begins at block 120 with a user invoking a publish command in the modeler 10, via a user interface or command line, to initiate publishing operations by notifying the publisher invocation module 12 to publish a model 8. As discussed, a publisher invocation module 12 may be registered with the modeler 10, such that the user may rely on the publisher invocation module 12 to select one of the registered publishers 18 to publish a model 8. In response to the notification, the publisher invocation module 12 invokes (at block 122) the model traversal module 14 to generate the intermediate structure 16 including elements of the object oriented program design represented in the model 8. To generate the intermediate structure 16, the model traversal module 14 may traverse the model 8 and for each defined artifact in the model 8 generate (at block 128) an element or attribute in the intermediate structure 16 for the located artifact. For instance, for a class definition 70a, including defined interfaces, relationships, etc., one element 72 may be generated in the intermediate structure 16 for each class artifact and element attributes 74, 76, and 78 generated providing information on interface artifacts (methods and objects), relationship artifacts (subclass and inheritance) of the defined class 70a. For each element in the intermediate structure 16, the publisher invocation module 12 may include (at block 130) a publishing attribute 80 of rendering information 64 on how the classes, objects, interfaces, etc. will appear in the output, such as fonts, colors, font sizes. The publishing attributes 80 may be provided by the user of the modeler 10 or from a publisher 18.

To select a publisher 18 registered in the publisher registry 26, the publisher invocation module 12 determines (at block 132) model attributes of the model 8, such as whether the model 8 comprises a design, implementation or scenario, and compares with the attributes 52 (FIG. 2) of the registered publisher entry 24. For instance, a compatible publisher 18 may comprise a publisher whose publisher entry attributes 52 matches the type of the model 8, e.g., design, implementation, scenario (use case, activity), statechart, sequence, etc. The publisher invocation module 12 invokes (at block 134) the determined publisher 18 to publish the model 8. In response, the invoked publisher 18 accesses (at block 136) the intermediate structure 16 to determine elements 72 and element attributes 74, 76, 78, and 80. The determined elements may comprise elements in addition to elements 74, 76, 78, and 80 shown in FIG. 4. The publisher 18 processes (at block 138) the formatting information 60 to determine rendering information 64 for the at least one determined element type and the at least one determined attribute type, such that the artifact type 62 of the formatting information 60 matches the type of the determined element or attribute to publish. The publisher 18 then renders (at block 140) each determined element and element attribute into the published output 20 using the determined formatting information for that element and attribute type.

Described embodiments provide a technique to enable a user of a modeler 10 to select an appropriate publisher of a model that the user has developed to provide customized and suitable formats to render output for different model 8 types. The published output 20 may be in a format readily accessible and transferable to the recipient, such as HTML, PDF, etc.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in a computer readable medium, where such medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The computer readable medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In certain embodiments, the described components, such as 10, 12, 14, 2, 26 may be deployed to a computer system to perform the described operations.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article or a different number of devices/articles may be used in place of the described more than one device or article.

The functionality and/or the features of a device may be alternatively embodied by one or more other devices which are not explicitly described as having such functionality/features. Thus, other embodiments of the present invention need not include the device itself.

The illustrated operations of FIGS. 5 and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   generating, from a model, by a computing device, an intermediate data structure having elements providing information on the model, wherein the model defines an object oriented program design;
   selecting by the computing device, from a publisher registry having a plurality of registered publishers, one registered publisher to use to publish the model, wherein the publisher includes formatting information to generate model output; and
   accessing, by the computing device using the selected publisher, the intermediate data structure and generating output from the elements in the intermediate data structure according to the formatting information to provide a visualization of the defined model.

2. The method of claim 1, further comprising:
   registering publishers in the publisher registry, wherein each publisher provides different formatting information to provide a different format of the elements in the intermediate data structure.

3. The method of claim 1, wherein the elements included in the intermediate data structure comprise definitions of classes, and wherein each class element in the intermediate data structure has attributes defining at least one of interfaces, objects, and relationships of the class.

4. The method of claim 3, wherein at least one attribute of the class element provides rendering information on how the information on the class and its interfaces, objects, subclass relationships, and inheritance relationships are to appear in the output.

5. The method of claim 1, further comprising:
receiving notification from a modeler to publish the model; and
invoking the first module to generate the intermediate structure in response to the notification by the modeler.

6. The method of claim 1, wherein the publisher generates the output from the intermediate data structure by:
providing, by the publisher, formatting information for element and attribute types;
processing the intermediate structure to determine elements and attributes providing information on the model definitions;
processing the formatting information to determine formatting information for the at least one determined element type and the at least one determined attribute type; and
rendering each determined element and element attribute in the output using the determined formatting information for the determined element and attribute types.

7. A method, comprising:
generating from a model, by a computing device, an intermediate data structure having elements providing information on the model, wherein the model defines an object oriented program design;
providing, by the computing device, a publisher registry having a plurality of registered publishers, wherein one registered publisher is used use to publish the model and wherein the publisher includes formatting information to generate model output and attributes of each registered publisher
selecting one registered publisher having attributes that match attributes of the model; and
accessing, by the selected publisher, the intermediate data structure and generating output from the elements in the intermediate data structure according to the formatting information to provide a visualization of the defined model.

8. The method of claim 7, wherein attributes of the model indicate a model type and wherein the attributes for each registered publisher indicate a model type, wherein one registered publisher and the model match when the model type indicated in their attributes match.

9. A system, comprising:
a processor;
a computer readable medium including:
at least one publisher including formatting information to generate model output; and
a publisher registry indicating at least on of the publishers as registered in the publisher registry;
a first module including code executed by the processor to access a model to generate an intermediate structure having elements providing information on the model, wherein the model defines an object oriented program design;
a second module including code executed by the processor to select one registered publisher in the publisher registry to use to publish the model, wherein the selected publisher includes code executed by the processor to access the intermediate data structure and generate output from the elements in the intermediate data structure according to the formatting information to provide a visualization of the defined model.

10. The system of claim 9, further comprising:
a third module including code executed to register publishers in the publisher registry, wherein each publisher provides different formatting information to provide a different format of the elements in the intermediate data structure.

11. The system of claim 9, wherein the elements included in the intermediate data structure comprise definitions of classes, and wherein each class element in the intermediate data structure has attributes defining at least one of interfaces, objects, and relationships of the class.

12. The system of claim 9, wherein the publisher registry includes attributes of each registered publisher, and wherein selecting one registered publisher in the publisher registry further comprises:
determining one registered publisher having attributes that match attributes of the model, wherein the selected publisher comprises the determined publisher.

13. An article of manufacture comprising a tangible and non-transitory computer-readable medium storing code that is executable by a processor, the code comprising:
a publisher registry indicating a plurality of registered publishers including formatting information to generate model output;
a first module including code executed by the processor to access a model to generate an intermediate structure having elements providing information on the model, wherein the model defines an object oriented program design; and
a second module including code executed by the processor to select one registered publisher in the publisher registry to use to publish the model, wherein the selected publisher includes code executed to access the intermediate data structure and generate output from the elements in the intermediate data structure according to the formatting information to provide a visualization of the defined model.

14. The article of manufacture of claim 13, further comprising:
a third module including executed to register publishers in the publisher registry, wherein each publisher provides different formatting information to provide a different format of the elements in the intermediate data structure.

15. The article of manufacture of claim 13, wherein the elements included in the intermediate data structure comprise definitions of classes, and wherein each class element in the intermediate data structure has attributes defining at least one of interfaces, objects, and relationships of the class.

16. The article of manufacture of claim 15, wherein at least one attribute of the class element provides rendering information on how the information on the class and its interfaces, objects, subclass relationships, and inheritance relationships are to appear in the output.

17. The article of manufacture of claim 13, wherein the second module code is executed to further perform:
receiving notification from a modeler to publish the model; and
invoking the first module to generate the intermediate structure in response to the notification by the modeler.

18. The article of manufacture of claim 13, wherein the publisher generates the output from the intermediate data structure by:

providing, by the publisher, formatting information for element and attribute types;

processing the intermediate structure to determine elements and attributes providing information on the model definitions;

processing the formatting information to determine formatting information for the at least one determined element type and the at least one determined attribute type; and rendering each determined element and element attribute in the output using the determined formatting information for the determined element and attribute types.

19. An article of manufacture comprising a tangible and non-transitory computer-readable medium storing code that is executable by a processor, the code comprising:

a publisher registry indicating a plurality of registered publishers including formatting information to generate model output and attributes of each registered publisher;

a first module including code executed by the processor to access a model to generate an intermediate structure having elements providing information on the model, wherein the model defines an object oriented program design; and a second module including code executed by the processor to select one registered publisher in the publisher registry having attributes that match attributes of the model to use to publish the model, wherein the selected publisher includes code executed to access the intermediate data structure and generate output from the elements in the intermediate data structure according to the formatting information to provide a visualization of the defined model.

20. The article of manufacture of claim 19, wherein attributes of the model indicate a model type and wherein the attributes for each registered publisher indicate a model type, wherein one registered publisher and the model match when the model type indicated in their attributes match.

* * * * *